United States Patent [19]

Weidner et al.

[11] 4,266,928
[45] May 12, 1981

[54] FILLING DEVICE FOR INTRODUCING PRE-FOAMED POST-EXPANDABLE THERMOPLASTICS INTO MOLDS FOR THE PRODUCTION OF MOLDINGS

[75] Inventors: Richard Weidner, Puttelange-aux-Lacs, France; Ortwin Hahn, Paderborn, Fed. Rep. of Germany

[73] Assignee: CIVAG AG Institut für Verpackungsforschung

[21] Appl. No.: 93,107

[22] Filed: Nov. 13, 1979

[30] Foreign Application Priority Data

May 31, 1979 [DE] Fed. Rep. of Germany ....... 2922312

[51] Int. Cl.³ .......................... B29B 5/04; B29D 27/00
[52] U.S. Cl. .................................... 425/584; 264/51; 264/DIG. 10; 425/4 R
[58] Field of Search ................... 264/51, 53, DIG. 10; 425/4 R, 584, 447

[56] References Cited

U.S. PATENT DOCUMENTS

| | | | |
|---|---|---|---|
| 3,139,466 | 6/1964 | Couchman | 264/DIG. 10 |
| 3,351,978 | 11/1967 | Kraus et al. | 264/DIG. 10 |

FOREIGN PATENT DOCUMENTS 38-5587  5/1963  Japan ............................... 264/DIG. 10

*Primary Examiner*—Philip Anderson
*Attorney, Agent, or Firm*—Larson, Taylor and Hinds

[57] ABSTRACT

The present invention relates to a filling device for introducing pre-foamed, post-expandable thermoplastics into molds for the production of moldings from plastic foams, especially from pre-foamed polystyrene foam, for example Styropor or Styrocell, in which the pre-foamed plastic is introduced in granular form into the mold by reason of a pressure difference existing between the stock container for the plastic granules and the mold and/or introduction of injected air. The filling device essentially consists of a cylindrical piston case with a lateral feed pipe for the plastic granules and a piston which is movable in the longitudinal direction within the cylindrical piston, for closing the mold inlet orifice after filling has taken place. The filling device according to the invention is characterized by a movable shut-off sleeve, which, by means of a spring, blocks the supply of granules when the piston has passed the feed pipe in the direction towards the mold.

6 Claims, 6 Drawing Figures

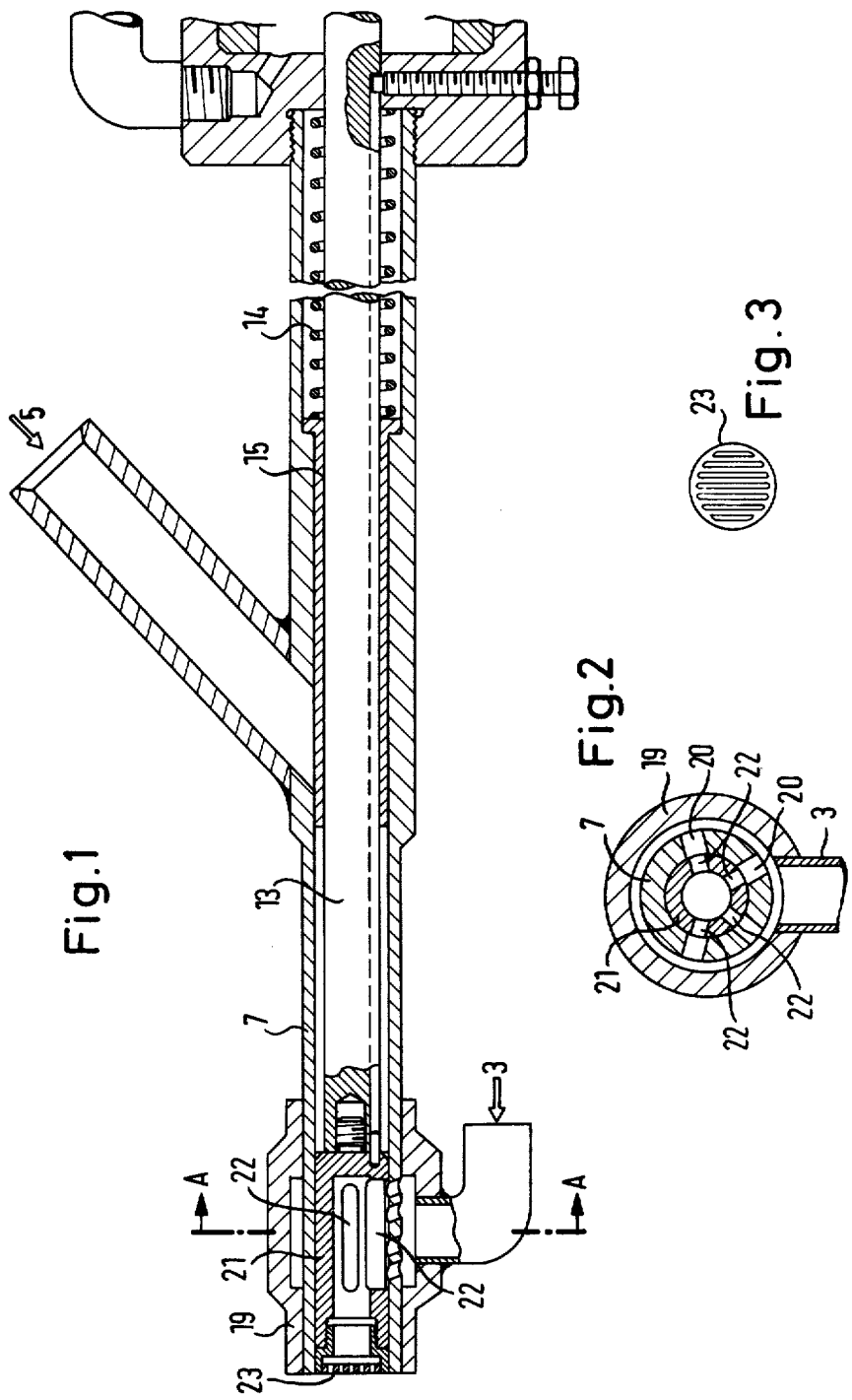

FILLING DEVICE FOR INTRODUCING PRE-FOAMED POST-EXPANDABLE THERMOPLASTICS INTO MOLDS FOR THE PRODUCTION OF MOLDINGS

The present invention relates to a filling device for introducing pre-foamed, post-expandable thermoplastics into molds for the production of moldings from plastic foams, especially from pre-foamed polystyrene foam, for example Styropor or Styrocell, with which device the pre-foamed plastic is introduced in granular form into the mold by reason of a pressure difference existing between the stock container for the plastic granules and the mold and/or the additional introduction of injected air.

In recent decades a large number of processes and devices for the production of moldings from expandable polystyrene foam (EPS) have been disclosed in which pre-foamed plasic granules are post-foamed, and sintered, in a mold with the supply of heat.

With these known processes, either the mold only is warmed from the outside, this, however, being a reasonable possibility only in the case of very thin moldings, or molds are employed which are provided with holes or slits through which the pre-foamed plastic granules cannot emerge but the steam or the hot water used for warming can enter into the mold and between the granules. Furthermore, processes and devices of the initially mentioned type have been disclosed, in which a vacuum is applied to the mold before it is filled with the pre-foamed plastic granules and the mold is pre-heated from the outside, without the heating medium necessary for this being able to penetrate into the mold. A small amount of steam is passed in during or after the introduction of the granules into the mold and a vacuum continues to be applied to the mold during the entire filling time. In this case, the mold again has holes or slits, but these open into special vacuum or steam feed lines.

The filling device is of central importance in all the devices which are used to carry out these known processes. The amount of air which is introduced with the pre-foamed plastic granules and which so-to-say acts as the transport agent either escapes through the holes and/or slits in the mold or is withdrawn from the mold by means of vacuum devices.

For example, the operation of one known process, in which, preferentially, the plastic granules are to be introduced at the same time as steam into the mold, was made more difficult by the fact that no filling device which was reliable and in particular simple and thus rapid in operation was available. With this process, the pre-foamed plastic granules were fed into the mold via a metering device which is shown in FIG. 6 and which has an adjustable plate 117, the position of which determines the volume of the measurement space 118 and thus the desired amount of granules to be introduced, a piston rod 119 passing through this plate 117 and this rod closing the feed opening 120 after filling of the mold is complete. The measurement space 118 is pre-evacuated by means of a suction line 112 which contains a valve 121 and is connected to the vacuum line or a vacuum tank, so that the plastic granules are drawn in from a stock vessel 123 via a valve 124 into the measurement space 118 of the metering device. At this point in time, the mold is closed by the piston 125, to which pressure is applied and which is connected to the piston rod 119, by the valve 127 being in the open position. If the valve 127 is closed and, instead, the valve 126 is opened, the piston 125 pulls the piston rod 119 back and thus exposes the feed opening 120.

In the arrangement shown, the introduction of the measured amount of plastic granules from the measurement space 118 of the metering device into the mold is effected with the aid of the steam required to heat the granules to the operating temperature and/or of the compressed air, the steam and/or compressed air flowing through a valve, which is not shown, and through a steam line and/or compressed air line, which are not shown, into the plate 117, which is of hollow construction, and flowing out through openings in the front side of the plate, under pressure.

In another known filling device, which essentially consists of a cylindrical piston case and a lateral feed pipe for the plastic granules and a piston which is movable in the longitudinal direction in the cylindrical case, for closing the mold inlet orifice after filling has taken place, and with which the piston diameter is considerably smaller than the diameter of the cylindrical piston case, the plastic granules present, above the piston, in the cylindrical piston case and in the feed lines after the mold inlet orifice has been closed must be withdrawn under suction. The disadvantages associated with this are obvious. Moreover, filling devices of this type do not permit simultaneous steaming of the granules to be effected during entry of the plastic granules into the mold.

The object of the invention was, therefore, to provide a filling device which operates not only advantageously with injected air but also without injected air and preferably permits steaming of the plastic granules to be effected during and/or after introduction of the plastic granules into the mold, but especially even before entry of the plastic granules into the mold, and is designed in such a way that withdrawal, under suction, of plastic granules present in the cylindrical piston case is no longer necessary.

This object is achieved according to the invention by means of a filling device which has a movable shut-off sleeve which, by means of a spring, blocks the supply of granules when the piston has passed the feed pipe in the direction towards the mold. Steaming of the plastic granules during or after their introduction into the mold has been solved by special arrangements of steam feed devices.

The invention thus relates to a filling device for introducing pre-foamed, post-expandable thermoplastics into molds for the production of moldings from plastic foams, especially from pre-foamed polystyrene foam, for example Styropor or Styrocell, in which device the pre-foamed plastic is introduced in granular form into the mold by reason of a pressure difference existing between the stock container for the plastic granules and the mold and/or the introduction of injected air, the said device essentially consisting of a cylindrical piston case with a lateral feed pipe for the plastic granules and a piston which is movable in the longitudinal direction within the cylindricl case, for closing the mold inlet orifice after filling has taken place, and being charcterized by a movable shut-off sleeve, which, by means of a spring, blocks the supply of granules when the piston has passed the feed pipe in the direction towards the mold.

Preferably, the diameter of the piston is such that it extends to the walls of the cylindrical piston case, so that when the mold inlet orifice is closed all of the plastic granules present in the cylindrical piston case are pressed into the mold. In order to facilitate this, the mold also has a mold inlet orifice which is of the same or virtually the same diameter as the cylindrical piston case. In this way, the plastic granules present in the cylindricl piston case can be pressed rapidly and without overcoming great resistance into the mold. At the same time, as a result of this, a certain compaction of the plastic granules in the mold takes place, by which means the sintering effect is promoted.

So that steaming of the plastic granules can already be effected during filling, the filling device according to the invention preferably has a steam feed line, which passes within the cylindrical piston case, passes through the piston and ends at the mold inlet orifice, so that, in operation, the plastic granules penetrate into the mold at virtually the same time as the steam.

With conventional process techniques it can be necessary to use injected air to achieve or to aid the introduction of the plastic granules. For this purpose, the filling device according to the invention has a corresponding injected air feed line.

Another variant of the invention, which is particularly preferred and with which steaming of the plastic granules is effected during their introduction or even before the plastic granules are introduced into the mold, comprises a steam feed jacket which surrounds the cylindrical piston case at the end in front of the mold inlet, the cylindrical piston case having steam inlet slits at positions enclosed by the steam feed jacket. If steam is also to be introduced into the mold after introduction of the plastic granules has ended, the piston is preferably constructed as a hollow piston which has corresponding steam slits in the piston, corresponding to the steam slits in the cylindrical piston case. Moreover, the hollow piston has, on the side facing the plastic granules, a piston plate which is perforated or provided with slits which permit the passage of steam but not of the granules.

The invention is explained below with the aid of FIGS. 1 to 5, which represent two particularly preferred embodiments according to the invention, without, however, restricting it thereto.

BRIEF DESCRIPTION OF THE DRAWINGS

FIG. 1 is a longitudinal section of the filling device according to the present invention.

FIG. 2 is a cross-section along section line AA of the filling device shown in FIG. 1.

FIG. 3 is a plan view of the piston plate according to the invention.

Figure 4:
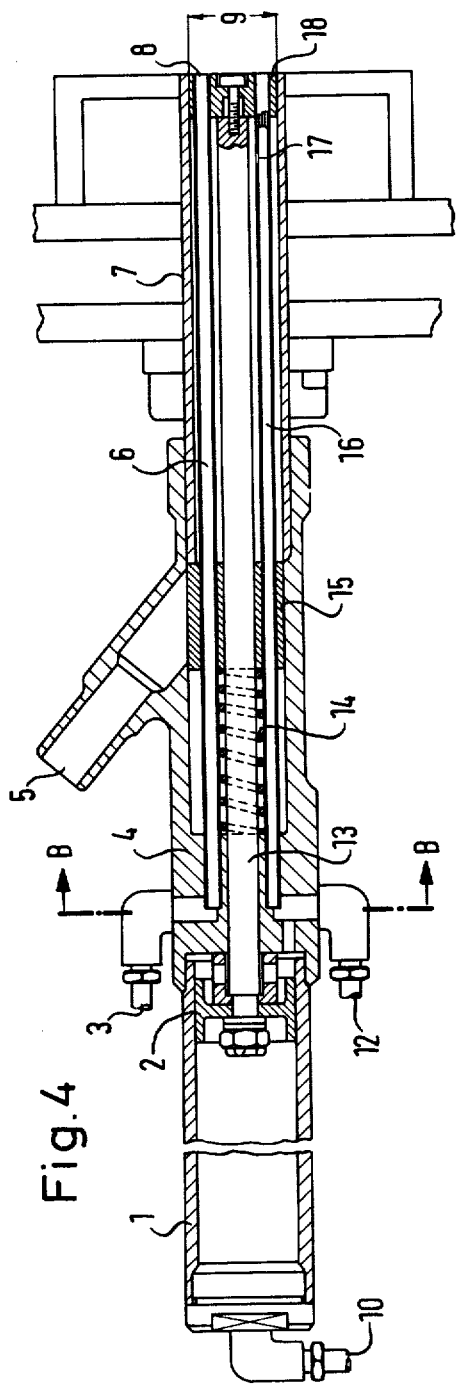
FIG. 4 is a longitudinal section of the preferred modified filling device according to the invention.

All of the details which are mentioned in the desription but are not visible in the drawings are also a part of the disclosure, essential to the invention, of the present invention.

In the figures and in the parts of the description relating thereto, the reference symbols have the following meaning:

1 Cylindrical case
2 T-T double-headed collar
3 Steam inlet
4 Casing
5 Lateral feed pipe for the plastic granules
6 Steam feed line (steam injector)
7 Cylindrical piston case
8 Steam outlet
9 Piston case orifice
10 Air inlet "piston forward"
11 Air inlet "injected air"
12 Air inlet "piston back"
13 Piston rod
14 Compression spring
15 Movable shut-off sleeve
16 Injected air feed line
17 Air outlet "injected air"
18 Piston
19 Steam jacket
20 Steam inlet slits in the cylindrical piston case
21 Hollow piston
22 Steam inlet slits in the hollow piston
23 Piston plate with steam slits FIG. 1 shows a longitudinal section of a filling device according to the invention, which preferably is employed for those processes in which the action of injected air can be dispensed with, since the mold is under a vacuum and the plastic granules are quasi sucked into the mold. After filling of the mold is complete, the movable shut-off sleeve 15 shuts off the plastic material present in the lateral feed pipe 5 from the cylindrical piston case 7 and at the same time pushes the plastic granules present in the cylindrical piston case 7 into the mold to be filled. The movable shut-off sleeve 15 not only makes it possible to separate the amount of material to be filled into the mold from the remainder of the fill material, but, in addition, the entire residual amount of plastic granules present in the cylindrical piston case is utilized for filling the mold. The steam jacket 19, which is located just in front of the inlet into the mold and surrounds the end of the cylindrical piston case, permits the plastic granules already to be charged with steam just before they enter into the mold and whilst filling the mold, and thus makes it possible to steam the individual granules on all sides, by which means a molding of homogeneous quality is obtained.

In order to accelerate the sintering process, it is also possible to feed steam into the mold, through the slits 22 located on the hollow piston 21, after filling of the mold is complete.

This very simple construction of the filling device according to the invention enables it to be adapted to very diverse molds and has the particular advantage that it can be used for filling the mold in the case of small molds with a matched small diameter. The fill amount of plastic granules and the steam requirement can also be suited to the particular mold by means of corresponding control valves.

With the aid of this filling device shown in FIG. 1, the following advantages are obtained:

1. Steam and plastic granules can be introduced into the mold at the same time.
2. The use of injected air can be dispensed with, since a vacuum is applied to the mold.
3. The withdrawal of the material under suction is no longer required.
4. Feeding of steam into the mold only after the mold feed opening has been closed by the hollow piston is possible.
5. As a result of the introduction of the residual plastic granules present in the cylindrical piston case 7, a compaction of the granule particles takes place in the mold and this necessarily gives rise to a better sintering effect and
6. More rapid filling of the mold is possible and this, together with the fact that with this arrangement less energy is consumed, results overall in lower production costs.

Thus, the mode of operation of the filling device shown in FIG. 1 is such that the plastic granules are not held back in the stock vessel and called from there but are already upstream of the filling device, that is to say are also present in the fill line between the storage vessel and the filling device.

By means of a vacuum produced in the mold, the route for the plastic granules located in the lateral feed pipe 5 is opened up when the hollow piston 21 is drawn back at the same time and the granules are transported into the mold. Steam flows via the steam jacket 19 into the mold at the same time as the plastic granules run in. The cylindrical piston case 7 has a number of steam slits 20 which enable the steam to enter freely with the plastic granules into the mold even when the piston is drawn back.

After filling of the mold is complete, the hollow piston 21 closes the mold inlet orifice and at the same time enables the movable shut-off sleeve 15 to prevent the entry of further material into the cylindrical piston case 7.

As a result of the forward motion of the hollow piston 21, which in its initial position is located behind the lateral feed pipe 5 for the plastic granules, the plastic granules present in the cylindrical piston case 7 are also pressed into the mold.

Even when the mold is closed by the hollow piston, steam can still enter into the mold through the piston plate 23 which is arranged within the hollow piston 21 and is either perforated or provided with slits.

Corresponding control valves permit a timed sequence of plastic granules and steam, suited to the volume of the mold.

FIG. 2 shows, in a cross-section along the section line AA in FIG. 1, how the steam jacket 19 surrounds the cylindrical piston case 7 with the steam slits 20 and the hollow piston 21 with the steam slits 22.

FIG. 3 shows a plan view of an embodiment of the piston plate 23, which is provided with steam slits.

FIG. 4 shows a further preferred embodiment according to the invention, in which, in the filling device, in addition to the feed line 16 for the injected air, the steam feed line 6 is preferably so constructed that it likewise acts as a steam injector and either assists or entirely replaces the air injector. Thus, with the aid of this filling device steam can be admitted to the mold at the same time as the plastic granules enter the mold. The control possibilities provided permit the amount of steam to be metered in accordance with the amount of plastic granules to be filled into the mold.

With this embodiment also, the movalbe shut-off sleeve 15 is of the same central importance as has already been described in FIG. 1. The procedure for this filling device according to the invention which is shown in FIG. 4 is as follows:

1. When the valves upstream of the device are opened, the piston 18 with the T-T double-headed collar 2 is located at the end of the cylindrical case 1. Thus, the movable shut-off sleeve 15 has necessarily also been brought into the end position by the piston 18, so that the orifice of the inlet pipe 5 for the plastic granules is opened. Thus, that end of the cylindrical piston case which is connected to the mold is nescessarily open, so that the plastic granules can flow into the mold without hindrance.

Thus, on opening the valve for the air inlet 11 (see FIG. 5), the material is brought from the stock container through the air injector into the mold.

2. Parallel to the opening of the valve upstream of the air inlet 11, the valve for the steam inlet 3 is also opened, at the same time or with a delay. Thus, the plastic granules are already charged with steam through the steam outlet 8 whilst the granules enter into the mold.

3. After filling of the mold is complete, the piston rod 13 and the piston 18 are brought forward, that is to say in the direction of the mold, by opening the valve upstream of the air inlet 10, and in this way the plastic granules present in the cylindrical piston case 7 are pressed into the mold and, at the same time, the mold is closed.

By releasing the pressure on the compression spring 14, the movable shut-off sleeve is also brought into the end position and entry of the plastic granules through the lateral feed pipe is thus stopped.

With this embodiment also, the following advantages are obtained:
1. Air and steam can act at the same time as the injector.
2. The two media can also be employed separately as the injector, that is to say either only the air or only the steam is used as the injector.
3. Withdrawal, under suction, of the material present in the cylindrical piston case 7 is no longer necessary.
4. A mechanical dwell pressure is necessarily produced during filling of the mold.
5. The filling device can be employed with all conventional molds.
6. Due to the mechanical dwell pressure when filling the mold, a better sintering effect results.
7. A better homogeneity with regard to sintering in the molding is achieved by the simultaneous steaming on entry into the mold.
8. Less energy is consumed and the filling operation proceeds more rapidly, as a result of which lower production costs are possible overall.

Both in the case of the embodiment according to FIG. 1 and in the case of the embodiment according to FIG. 4, it is also possible to feed in other gases in place of steam and/or air, for example to feed in hot inert gases in place of steam and to feed in separately vaporized organic liquids in place of air, the said liquids producing, as a result of their swelling action on the plastic granule grains, and additional "welding effect".

Figure 5:
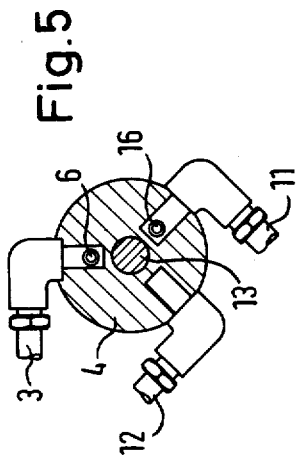
FIG. 5 is a cross-section along section line BB of the filling device shown in FIG. 1.
Figure 6:
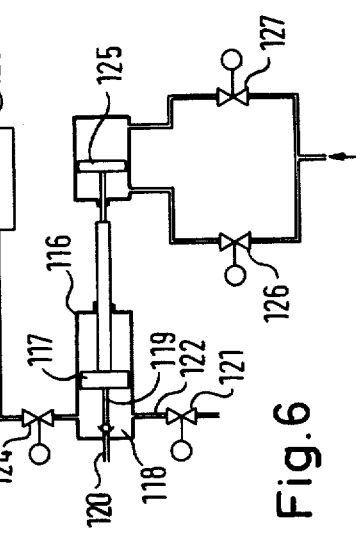
FIG. 6 is a prior art meaning and feeding device.

FIG. 5 shows a cross-section along the section line B—B in FIG. 1.

We claim:
1. Filling device for introducing pre-foamed, post-expandable thermoplastics into molds for the production of moldings from plastic foams, especially from pre-foamed polystyrene foam, in which device the pre-foamed plastic is introduced in granular form into the mold by reason of a pressure difference existing between the stock container for the plastic granules and the mold and/or the introduction of injected air, the said device comprising a cylindrical piston case with a lateral feed pipe for the plastic granules and a piston, which is movable in the longitudinal direction within the cylindrical piston, case for closing the mold inlet orifice after filling has taken place, characterized by a movable shut-off sleeve, which, by means of a spring, blocks the supply of granules when the piston has passed the feed pipe in the direction towards the mold.

2. Filling device according to claim 1, wherein said piston extends to the walls of the cylindrical piston, said device including a mold inlet orifice which has the same diameter as the piston case.

3. Filling device according to claim 2, characterized by a steam feed line which passes within the cylindrical piston case, passes through the piston and ends at the mold inlet orifice.

4. Filling device according to claim 1 characterized by an injected air feed line, which runs within the cylindrical piston case and passes through the piston.

5. Filling device according to claim 2, characterized by a steam feed jacket, which surrounds the cylindrical piston case at the end in front of the mold inlet, and by steam inlet slits (20) in the cylindrical piston case at the points which are surrounded by the steam feed jacket.

6. Filling device according to claim 1, wherein said piston comprises a hollow piston provided with steam-permeable slits and a piston plate which is perforated and/or provided with slits and is permeable to steam but not to the granules.

* * * * *